April 16, 1929.  C. G. GARRARD  1,709,345
CHANGE SPEED GEAR
Filed Sept. 23, 1927
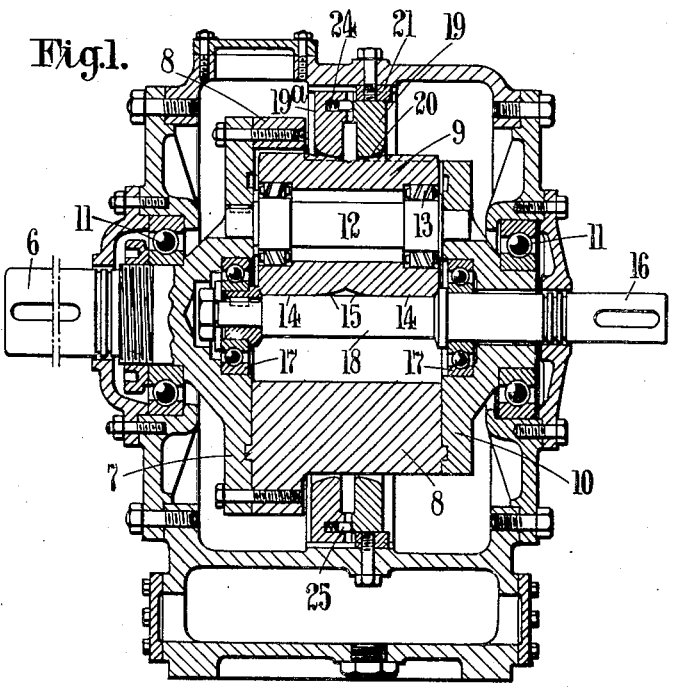
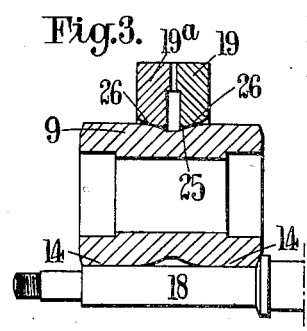
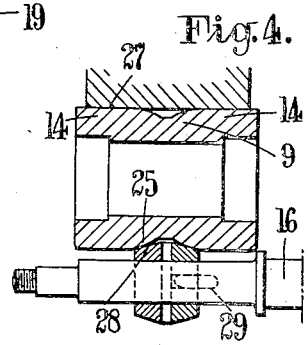
INVENTOR,
Charles George Garrard,
BY
Samuel W. Balch
ATTORNEY.

Patented Apr. 16, 1929.

1,709,345

UNITED STATES PATENT OFFICE.

CHARLES GEORGE GARRARD, OF LONDON, ENGLAND, ASSIGNOR TO GARRARD GEARS LIMITED, OF LONDON, ENGLAND, A LIMITED-LIABILITY COMPANY.

CHANGE-SPEED GEAR.

Application filed September 23, 1927, Serial No. 221,429, and in Great Britain July 7, 1927.

This invention relates to change speed gears of the type comprising satellite rollers preferably carried by a cage or the like, contacting with and rotating between inner and outer circular race tracks.

With such gears it has been proposed to form the inner race track with a cylindrical surface and to divide the outer race track into two parts each of which is formed with an internal curved and somewhat spherical surface, the satellite rollers being mounted to float in their carrying cage and formed with cylindrical portions for engaging the inner race, and curved portions for engaging the outer divided race, the parts of the outer race when the gear is running tending by the co-operation of the contacting curved surfaces to ride up the surfaces of the satellite rollers and thus move longitudinally, thereby frictionally gripping the satellite rollers and also causing them to move in their floating bearing to grip the inner race.

According to the present invention, in speed gears of the type to which the invention relates, the satellite rollers are mounted to float, or be capable of slight radial movement, and are formed with cylindrical portions and with either curved or coned portions, the curved or coned portions preferably being arranged in opposed pairs; one of the co-operating races is formed cylindrical or with cylindrical portions to engage the cylindrical part of the satellite rollers and the other race is formed with coned or curved portions preferably arranged in opposed pairs in such a manner that when the satellite roller has curved portions, conical portions on the race engage therewith, whilst when the satellite rollers have coned portions, curved portions of the race engage therewith.

The co-operating curved and coned portions come at such an angle in longitudinal section at their points of contact that this angle is somewhat less than and certainly does not exceed the frictional angle of slip between the two metals from which the parts are made, as is well known in the types of gear to which the invention relates.

The race formed with the curved or coned portions arranged in opposed pairs, or the satellite rollers formed with the coned or curved portions arranged in opposed pairs are divided allowing longitudinal movement due to the drive; means are provided where required, for instance springs, for causing a preliminary longitudinal movement.

Means are also provided if required for holding one of the races or the cage carrying the satellite rollers from rotation, thus leaving the two remaining elements free for connection to the shafts to be geared together, or other desired gearing arrangements to be carried into effect.

In order that the invention may be better understood, it will now be described with reference to the accompanying drawings in which:—

Fig. 1 is a sectional elevation of one form of gear constructed according to the invention.

Fig. 2 is a plan view of the outer race detached, and

Figs. 3 and 4 are somewhat diagrammatic fragmentary sectional elevations illustrating other combinations of the parts.

The gear shown in Fig. 1 of the drawings is suitable for gearing up from a slow running driving shaft, such for example as the shaft of a steam engine to another shaft, such for example as the shaft of a generator which requires to run at a much higher speed, and the gear is located axially in alignment with the shafts of the steam engine and the shaft of the generator.

In the drawings, 6 is the driving shaft formed with one end plate 7 of the cage 8 which carries the satellite rollers 9. 10 is the other end plate of the cage and the shaft 6, end plates 7 and 10 and cage 8 are mounted in the bearings 11.

The end plates 7 and 10 of the cage at equi-angular distances apart are bored for the reception of axles 12. Three such axles are preferably provided and they are so mounted in the end plates that they are held from rotation. If desired they may be so mounted that they allow a slight radial movement towards the centre of the cage.

The satellite rollers 9 are formed hollow and are mounted around the axles 12 by means of roller bearings 13, the rollers of which are preferably formed from helical strips having a slight amount of resiliency. This allows the satellite roller 9 under stress to have desired radial movements.

In the form shown in Fig. 1, the satellite roller 9 has two end cylindrical portions 14 and two central and opposed beveled portions 15, the beveled surfaces being coned or with straight elements.

16 is the shaft to be driven. This is mounted in bearings 17 in the end plates 7 and 10 of the cage and the portion 18 thereof coming between the end plates constitutes the inner race and is formed cylindrical to engage with the cylindrical portions 14 of the satellite rollers 9.

The outer race is constituted by two somewhat similar rings 19 and 19$^a$ formed on their interior faces with beveled surfaces 20, the elements of which are curved in planes through the axis of revolution. The curved surfaces 20 engage with the conical portions 15 of the satellite rollers 9 therefore with point contact, and the angular engagement between them in longitudinal or axial cross section is such that the angle does not exceed the frictional angle of slip between the two metals. The ring 19 is held from rotation by key pieces 21 attached to the outer casing engaging in slots or notches 22 on the exterior of the ring. This does not prevent axial movement of the ring but only holds the ring from rotation. Where the two rings come into contact on their inner faces they are formed with co-operating bevelled projections 23 as shown in Fig. 2. The ring 19$^a$ is held generally from rotation by the engaging bevelled projections 23 but can move round circumferentially to a slight angular extent at the same time as the two rings 19 and 19$^a$ move further apart axially.

A number of recesses containing compression springs 24 are formed in the ring 19$^a$, the compression springs forcing out small plungers 25 which bear against the ring 19. This arrangement causes the curved surfaces 20 to be forced into contact with the coned portions 15 with an initial grip, thus doing away with slip when starting up.

The action of the gear will be readily understood. The shaft 6 is rotated and carries round with it the cage 8 and satellite rollers 9. These latter roll in contact with the rings 19 and 19$^a$, which latter as previously explained are caused to move to a slight extent longitudinally under the driving grip. This longitudinal movement forces the satellite rollers a slight extent radially inwards, the movement either being permitted by the resiliency of the rollers 13, or if the axle 12 is mounted to have a slight radial movement, by this mounting. In some cases both the resiliency of the rollers and the movement of the axle may be utilized.

The cylindrical portions of the rollers 9 are thus forced into driving contact with the cylindrical inner race 18 formed integrally with the shaft 16 to be driven, and in this manner the said shaft is driven. The speed of this shaft as will be readily understood is much greater than the speed of the shaft 6, the ratio of the speeds depending upon the diameter of the portion 18 and the diameter of the portions of the periphery of the curved surfaces 20 of the rings 19 and 19$^a$ which grip the coned surfaces 15 of the satellite rollers 9.

In place of forming the satellite rollers 9 as shown in Fig. 1 with coned portions and the rings 19 and 19$^a$ with curved portions, in some cases as shown in Fig. 3, the satellite rollers may be formed with curved portions 25 which are somewhat spherical and the rings 19 and 19$^a$ with co-operating coned surfaces 26, the relationship between the curves and cones being as before. In this figure also the cylindrical portions 14 of the satellite rollers engage with a cylindrical portion 18 of the inner race.

In Fig. 4 another variation of the arrangement is shown, and in this case the outer race is formed with a cylindrical surface 27 which co-operates with the cylindrical portions 14 of the satellite rollers 9, the curved portions 25 of the satellite rollers co-operating with coned rings 28 carried by the inner shaft. These coned rings in this case constitute the inner race. They may both be keyed to the inner shaft 16 if desired in any manner that permits longitudinal movement, and if desired may have spring means for giving them an initial gripping contact. In some cases they may have double bevelled inter-engaging projections 23 similar to that described with regard to Figs. 1 and 2 and only one be keyed by a sliding key-way such as 29 to the shaft 16. Such an arrangement is shown in Fig. 4. In Fig. 4 in place of forming the satellite roller 9 with curved faces 25 and the rings 28 with the coned surfaces, the satellite roller may have the coned surfaces and the rings the curved surfaces.

In some cases the satellite rollers may be divided and made up from pairs of parts adapted to have longitudinal movement, automatically to obtain driving grip upon the inner or outer race which in this case does not normally have longitudinal movement, but which may if desired also move longitudinally. Any means may be provided for giving the preliminary grip of the divided parts of the satellite rollers with the co-operating races, and in this case also the floating nature of the mounting of the satellite rollers permits the radial movement necessary for causing driving contact between the co-operating cylindrical surfaces.

Although one pair of opposed conical or curved surfaces has been described in relation to the outer race, the satellite rollers or the inner race, it is of course obvious that any desired number of pairs of such parts may be used in a gear, the mechanism being modified accordingly.

The invention is not limited to the precise forms or details of construction described as these may be varied to suit particular cases.

What I claim and desire to secure by Letters Patent of the United States of America is:—

1. Friction gearing of the type set forth in which satellite rollers are formed with cylindrical surfaces and with beveled surfaces arranged in opposed pairs, an outer race constituting one of the elements in engagement with the satellite rollers, an inner race constituting another of the elements in engagement with the satellite rollers, one of the elements being formed with a cylindrical friction surface to engage the cylindrical friction surfaces of the rollers and the other element being formed with beveled friction surfaces arranged in opposed pairs, one of each of the coacting beveled friction surfaces being a coned surface and the other being a surface the elements of which are curved in planes through the axis of revolution whereby point contact is effected between the beveled portions.

2. Friction gearing of the type set forth in which satellite rollers are formed with cylindrical surfaces and with beveled surfaces arranged in opposed pairs, an outer race with beveled friction surfaces in engagement with beveled friction surfaces of the satellite rollers, one of each of the coacting beveled friction surfaces being a coned surface and the other being a surface the elements of which are curved in planes through the axis of revolution whereby point contact is effected between the beveled friction surfaces, and a cylindrical inner race which is engaged by the cylindrical friction surfaces of the satellite rollers.

3. Frictionally engaging rolling elements formed with opposed beveled friction surfaces in engagement between the elements, one of the elements being in two parts engaging each other by means of beveled projecting portions and each part having one of the opposed beveled friction surfaces, the parts being axially and circumferentially displaceable with respect to each other and one of the parts having means to restrain its circumferential movement while the other is free to move relatively in a circumferential direction to a slight angular extent and thereby effect axial displacement of the parts through the beveled projecting portions to increase the pressure between the frictionally engaging surfaces of the elements.

In witness whereof I affix my signature.

CHARLES GEORGE GARRARD.